Dec. 4, 1962

H. A. BOTTENHORN 3,066,566

GUIDE AND SUPPORT FOR UNITARY SHEAR ASSEMBLY

Filed May 18, 1960

INVENTOR
HERMANN A. BOTTENHORN
BY

AGENT.

Dec. 4, 1962  H. A. BOTTENHORN  3,066,566
GUIDE AND SUPPORT FOR UNITARY SHEAR ASSEMBLY
Filed May 18, 1960  5 Sheets-Sheet 3

INVENTOR
HERMANN A. BOTTENHORN
BY

AGENT.

Dec. 4, 1962 H. A. BOTTENHORN 3,066,566
GUIDE AND SUPPORT FOR UNITARY SHEAR ASSEMBLY
Filed May 18, 1960 5 Sheets-Sheet 4
FIG. 5.
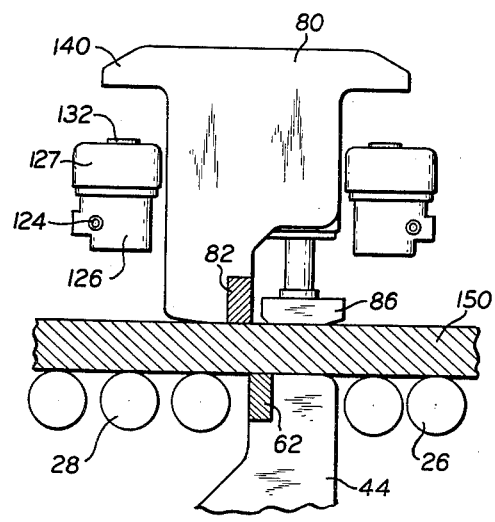
FIG. 6.
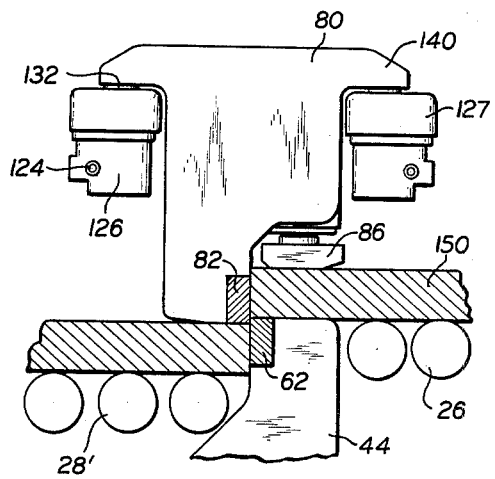
FIG. 7.
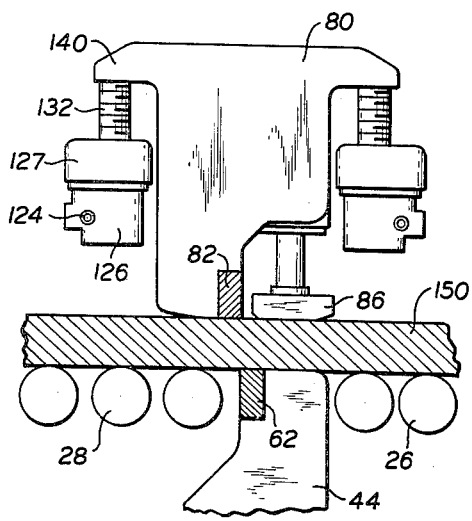
FIG. 8.
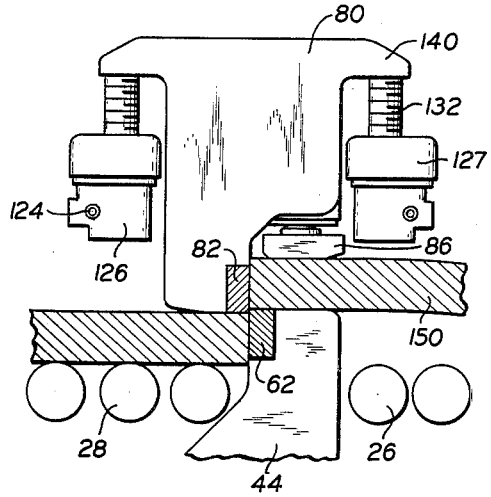
INVENTOR
HERMANN A. BOTTENHORN
BY
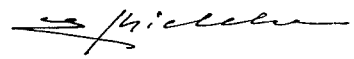
AGENT.

Dec. 4, 1962     H. A. BOTTENHORN     3,066,566
GUIDE AND SUPPORT FOR UNITARY SHEAR ASSEMBLY
Filed May 18, 1960     5 Sheets-Sheet 5
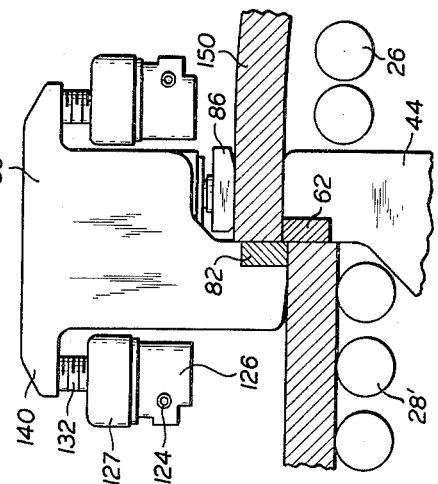
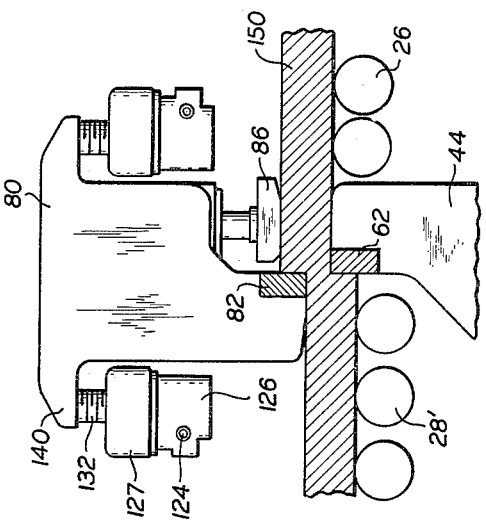
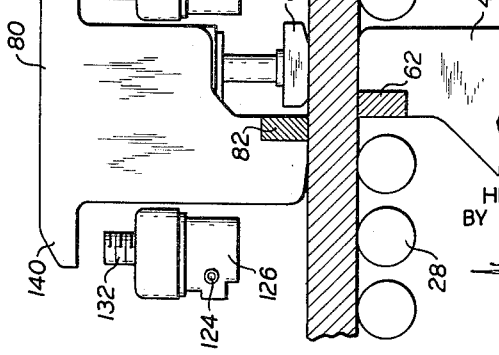
INVENTOR
HERMANN A. BOTTENHORN
BY
AGENT.

United States Patent Office 3,066,566
Patented Dec. 4, 1962

3,066,566
GUIDE AND SUPPORT FOR UNITARY
SHEAR ASSEMBLY
Hermann A. Bottenhorn, Little Neck, N.Y., assignor to
Baldwin-Lima-Hamilton Corporation, Philadelphia, Pa.,
a corporation of Pennsylvania
Filed May 18, 1960, Ser. No 29,968
5 Claims. (Cl. 83—623)

This invention relates to shears for cutting metal, and more particularly to vertical shears for cutting hot slabs, blooms and the like.

Conventional shears of the aforesaid type comprise a stationary bed or stand on which a pair of knife holders and knives are mounted for movement relative to each other. The reequired actuating means are entirely or partially mounted on the bed and connected to the movable parts. Assembly, disassembly and maintenance of such machines lead to certain difficulties due to the attachment of their actuating means to the bed.

Further, there are vertical shears which operate according to the down-cut principle, i.e., the upper knife holder and knife move downwardly to sever material. Other vertical shears employ the up-cut principle, i.e., the lower knife holder and its knife move upwardly to effect the severing step. In still other vertical shears the upper knife holder and knife move downwardly to sever a portion of the thickness of the material, and the lower knife holder and knife move upwardly to cut through the remainder of the thickness so that a combined down-cut and up-cut operation is performed. Each method has advantages for certain purposes, but it is expensive and cumbersome to have separate machines for the different operations.

It is an object of the invention to provide an improved and relatively simple metal shear which permits insertion and removal of the knife holders, knives, and all actuating means required for the cutting and return strokes as a unit.

It is another object of the invention to provide an improved vertical metal shear in which the completely assembled knife holders, knives, and required actuating means can be inserted and removed from the top as a unit.

It is also an object of the invention to provide a hydraulically operated, vertical metal shear in which a movable frame carries the knife holders, knives, and all cylinders and plungers required for the cutting and return strokes.

It is a further object of the invention to provide an improved and relatively simple vertical metal shear which is capable of operating selectively according to the down-cut principle, the up-cut principle, and the combined down-cut and up-cut principle.

It is a still further object of the invention to provide a vertical metal shear having relatively simple means for changing the mode of operation of the machine.

It is an additional object of the invention to provide an improved vertical metal shear which, though capable of performing down-cut, up-cut, and combined down-cut and up-cut operations, permits easy insertion and removal of the knife holders, knives, and all actuating means required for cutting and return strokes as a unit.

Various other objects, features and advantages of the invention will become apparent as the description proceeds.

In the drawings which illustrate an embodiment of the invention by way of example, FIG. 1 is an elevational view of a vertical metal shear according to the invention, partly in section and generally taken along line 1—1 of FIG. 3;

FIG. 2A shows a portion of FIG. 1 on a larger scale;

FIGS. 4 to 6 show a down-cut operation diagrammatically;

FIGS. 7 and 8 show an up-cut operation diagrammatically;

FIGS. 9 to 11 show a combined down-cut and up-cut operation diagrammatically.

Figure 1:
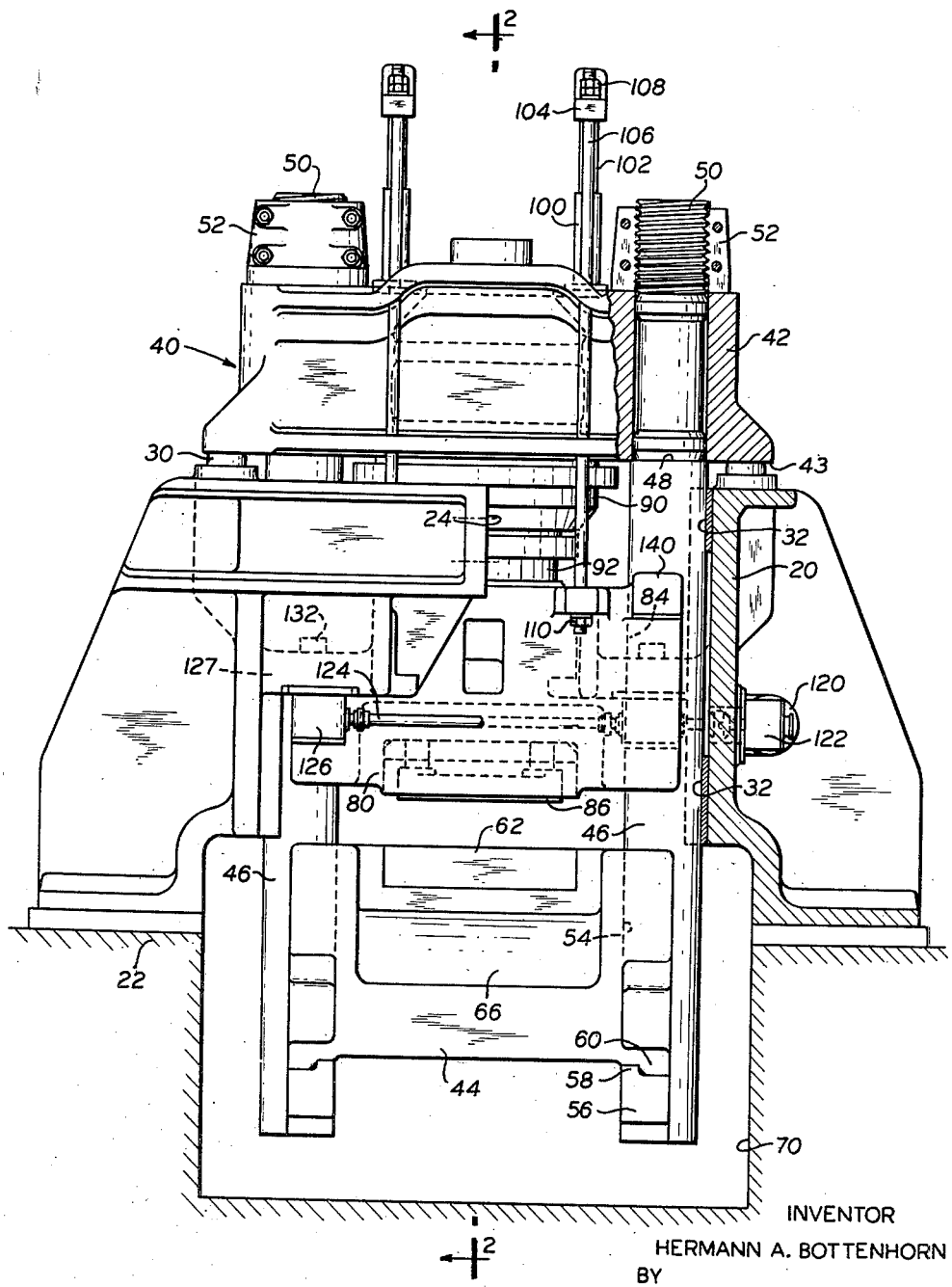
Figure 2:
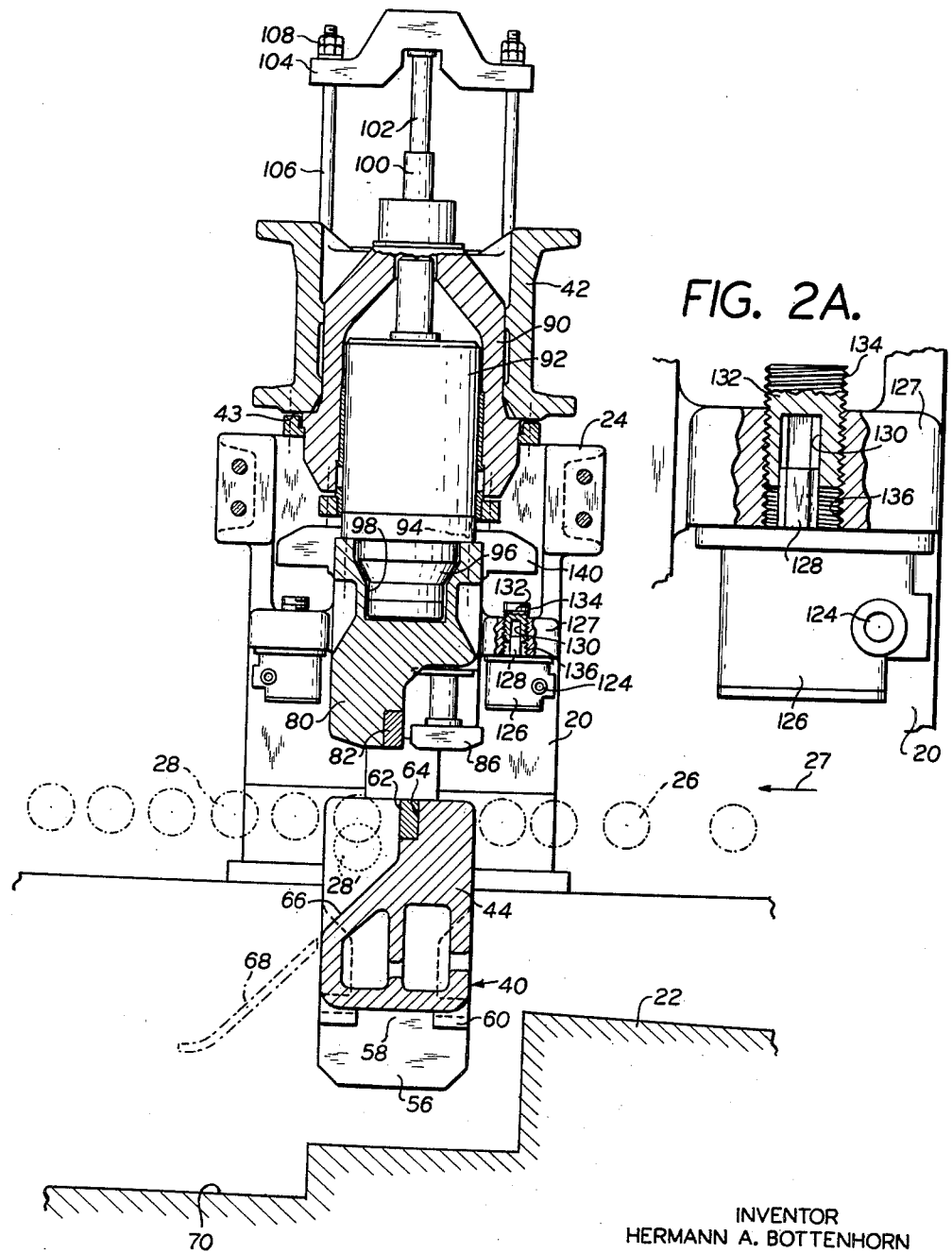
FIG. 2 is a section generally taken along line 2—2 of FIG. 1.
Figure 3:
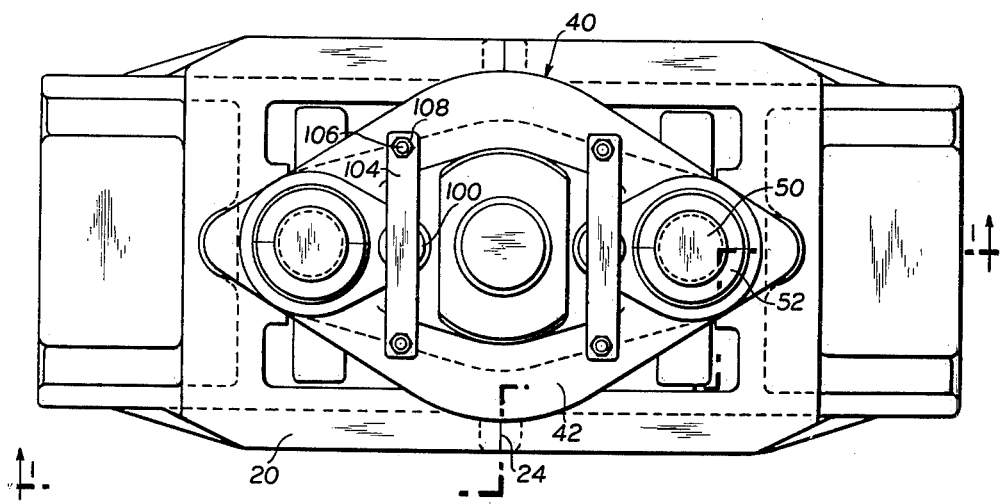
FIG. 3 is a diagrammatic plan view of the shear.

Referring to the drawings, the vertical shear illustrated comprises a stationary supporting structure such as a bed or stand 20 fastened to a foundation 22. The bed may be of the split type as shown at 24 to facilitate machining and mounting thereof. As indicated in chain lines in FIG. 2, feed rollers 26 are provided at one side of bed 20 to advance material such as hot slabs and blooms to the shear in the direction of the arrow 27 while delivery or discharge rollers 28 are positioned at the other side to receive cut sections of metal. The discharge rollers are depressible as indicated at 28'. Bed 20 has a pair of abutments 30 (FIG. 1) at its top and is provided with arcuate bearing faces 32 forming a vertical guideway. The abutments 30 are positioned at opposite sides of and close to the guideway, the open upper end of which is adapted to receive an assembly which extends into the guideway as will now be described.

A movable frame generally indicated at 40 includes a crosshead 42, a lower knife holder 44, and tie rods 46 connecting the crosshead and lower knife holder in a manner such that the lower knife holder is suspended from the crosshead in spaced relationship. Crosshead 42 has a face 43 arranged to contact the abutments 30 of bed 20 and to rest freely thereon, that is, solely under the action of gravity. Each of the tie rods 46 is rigidly secured to crosshead 42 by means of a shoulder 48 of the rod, a threaded rod end 50, and a nut 52 which as shown may be of the split type. As will be clear from FIG. 1, the arcuate bearing faces 32 of the bed are arranged to engage a segmental portion of the circumference of each of the tie rods. The remaining segmental portion of the circumference of each of the tie rods 46 is engaged and partly embraced by arcuate mounting faces 54 of the lower knife holder 44 and is provided at its lower end with a generally T-shaped head 56 having an integral projection which is in interlocking engagement with complementary projections 60 of the lower knife holder 44. In this way, the lower knife holder is firmly secured to the tie rods 46. The heads 56 and the joint formed by the interlocking projections 58, 60 clear the confines of the arcuate faces 32 during movement of frame 40 in the vertical direction.

Lower knife 62 is mounted in a recess 64 of the lower holder 44. To discard short crop ends and the like, the recess 64 has a sloping bottom 66 which cooperates with a chute 68 indicated in chain lines in FIG. 2, the chute being located in a pit 70 of the foundation.

An upper knife holder 80 carrying upper knife 82 is arranged on frame 40 and guided for movement relative thereto by means of its arcuate bearing faces 84 which partially embrace the tie rods 46 outside the confines of the arcuate faces 32 of bed 20. Conventional hold-down or stripper means 86 are movable against the pressure of springs (not shown) and serve to contact the material to be severed and thereby strip it from the upper knife.

Mounted on crosshead 42 is a fluid motor or aggregate in the form of a single-acting hydraulic cylinder 90 and plunger 92, the latter being secured to the upper knife holder 80 at 94. The lower end 96 of the plunger is received in a socket 98 of upper holder 80. A pair of single-acting hydraulic auxiliary or return cylinders 100 and plungers 102 are likewise mounted on crosshead 42 and act upon auxiliary crossheads 104 which are in turn connected to the upper knife holder 80 by means of auxiliary tie rods 106 having nuts 108, 110 (FIG. 1) on their threaded ends. Fluid under pressure may be supplied to the cylinders 90 and 100 by means such as flexible hoses.

To adjust the machine for the desired type of operation, a reversible electric motor 120 is mounted on bed 20 at one side thereof and arranged to drive intermediate gear box means 122, horizontal shafts 124, and four main gear boxes 126 secured to transverse walls 127 of bed 20. Each of the gear boxes 126 is adapted to rotate a short vertical shaft 128 (FIG. 2A), the upper end of which is splined or of non-circular cross-section and engages a corresponding socket 130 in a stroke-limiting element or stud 132 so that the stud will be caused to turn when shaft 128 rotates and may move axially relative to the shaft. Each stud 132 has threads 134 at its circumference and is mounted in a vertical, tapped, preferably bushed opening 136 of the respective wall 127. Upon actuation of the four gear boxes 126, therefore, the associated studs 132 will be caused to turn in their threaded mountings in unison and move upwards or downwards, depending upon the direction of rotation.

For engaging the studs 132, the upper knife holder 80 is provided with abutment means in the form of four lateral extensions or projections 140 which are outside the confines of the arcuate faces 32 of bed 20 to avoid interference therewith.

The range of vertical adjustment of the studs 132 is substantially equal to or exceeds the length of the cutting stroke of the upper knife and the studs may be moved entirely out of the path of the upper holder 80 or may be set to contact the extensions 140 of holder 80 at the start or in the course of a shearing operation to perform a selected type of cut in the following manner.

*Operation*

Figure 4:
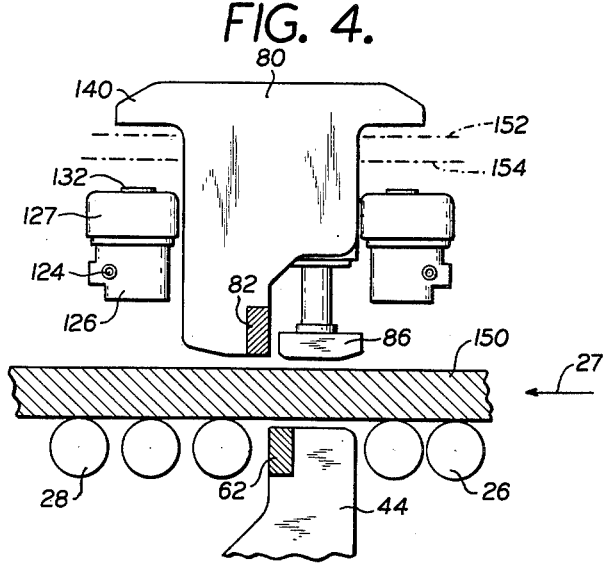

When it is desired to carry out a down-cut, motor 120 is energized to move the studs 132 to their lowermost level to clear the path of the lateral extensions 140 on the upper knife holder 80 as shown in FIG. 4 which illustrates the parts in their initial position, i.e., prior to the start of a cutting cycle. It should be noted that FIG. 4 indicates the maximum vertical spacing of the studs 132 and extensions 140 for a predetermined thickness of material. This spacing is equal to the length of the cutting stroke. It is also substantially equal to the distance from the edge of the withdrawn upper knife to the underside of the metal to be severed, exceeding this distance slightly in practice to obtain overlapping of the knives at the end of the cut.

In the initial position shown in FIG. 4, the edge of the lower knife 62 is in the usual manner disposed somewhat below the top of rollers 26, 28 so that material such as a hot slab or bloom 150 may be introduced into the shear without interference, the upper knife 82 being likewise disposed initially so as to clear the material to be cut.

When fluid under pressure is admitted to cylinder 90, frame 40 will first continue to rest on the abutments 30 due to the action of gravity while the upper holder 80 will start to descend freely. When the upper knife 82 contacts slab 150, however, the resistance to further downward movement of the upper knife will exceed the force required to lift frame 40 so that cylinder 90 will rise on plunger 92 and the lower knife 62 will be caused to ascend until it likewise contacts the slab (FIG. 5). Both knives are now urged against the material and encounter the same resistance to penetration thereof, but since the action of gravity assists in further advance of the upper knife while tending to stop the lower knife, the upper knife will be moved to perform the desired down-cut with the discharge rollers being depressed as shown in FIG. 6.

To carry out an up-cut operation, motor 120 is energized to move the studs 132 to the upper level indicated at 152 in FIG. 4. This is the minimum vertical spacing between the studs and the lateral extensions 140 for a predetermined thickness of material, the spacing being substantially equal to the initial clearance between the edge of upper knife 82 and the top of slab 150. When fluid pressure is admitted to cylinder 90, both knives will engage the slab as described hereinbefore, but as shown in FIG. 7 the extensions 140 are now in contact with the studs 132. Therefore, the upper knife holder 80 is prevented from further downward movement and thus arrested and cylinder 90 will rise on plunger 92, thereby forcing the lower knife upward so that the desired up-cut step will be carried out as shown in FIG. 8.

For performing a combined down-cut and up-cut operation, motor 120 is energized to move the studs 132 to the intermediate level indicated at 154 in FIG. 4. Upon the admission of pressure to cylinder 90, both knives will again be caused to contact the slab as illustrated in FIG. 9. Since there is still play between the studs 132 and extensions 140, the machine will perform for a limited time as during a down-cut. When the position of FIG. 10 is reached and about half the thickness of the slab has been severed with the delivery rollers being depressed as indicated at 28′, the extensions 140 will engage the studs 132 so that the upper knife holder 80 is prevented from descending further. Accordingly, cylinder 90 will rise on plunger 92 and the lower knife 62 will be forced to ascend and perform an up-cut through the remaining thickness of the slab as illustrated in FIG. 11. The desired combined down-cut and up-cut operation is thus obtained.

Regardless of the type of operation selected, all shearing forces are sustained by the frame 40 and are not transmitted to the bed 20.

After each of the operations described the parts may be returned to their initial positions by admitting pressure to the return cylinders 100 and connecting cylinder 90 to exhaust. The hold-down or stripper means 86 operate in conventional manner to disconnect the severed slab from the upper knife.

It will be clear from the foregoing description that the assembly comprising frame 40 with the lower knife thereon, upper holder 80 with the upper knife thereon, and the complete actuating means 90, 92, 100, 102 can readily be inserted in and removed from the vertical guideway formed by the arcuate bearing faces 32 by simply lowering the assembly onto or lifting it from the bed or stand 20. The abutments 30 serve to limit downward movement of the assembly in the bed and to support it in the lower position but no part of the assembly is secured to the bed. It will also be clear that relatively simple and effective means are provided for adjusting the machine to perform a down-cut operation, an up-cut operation, or a combined down-cut and up-cut operation.

While a preferred embodiment of the invention has been described, it will be understood that various modifications and changes may be made without departing from the scope of the invention as defined in the appended claims. For example, frame 40 supporting the knives and all actuating means required for the cutting and return strokes may be used not only in vertical shears but also in shears of different orientation to facilitate assembly, disassembly and maintenance. If desired, the adjustable stroke-limiting elements 132 and the associated mechanism may be positioned on the upper knife holder 80, instead of being mounted on the bed 20. In this case, cooperating fixed abutment means will be provided on the bed.

Having described my invention, what I claim and desire to secure by Letters Patent is:

1. A vertical shear for cutting metal, comprising a stationary supporting structure having a substantially vertical guideway therethrough, said structure being provided with substantially horizontal abutment means arranged symmetrically with respect to and externally of said guideway; and an assembly cooperating with said guideway, said assembly including a frame, a holder movably mounted on said frame, a pair of knives cooperating with each other and supported on said frame and holder, respectively, actuating means mounted on said assembly for causing relative movement of said frame and holder towards and away from each other, and a contact face on said frame disposed below said actuating means and arranged to rest freely upon said abutment means of the supporting structure with a portion of said assembly extending downwardly from said contact face into said guideway and being slidably received therein, said downwardly extending portion of the assembly clearing the confines of said guideway throughout so that said assembly is engageable with and freely removable from said guideway vertically as a unit, said assembly when in place on said abutment means being held vertically solely by the action of gravity.

2. A vertical shear for cutting metal, comprising a stationary supporting structure having a substantially vertical guideway therethrough, said structure being provided with a pair of substantially horizontal abutment means symmetrically arranged at opposite sides of said guideway and externally thereof; and an assembly cooperating with said guideway, said assembly including a crosshead at its top, a lower knife holder, connecting means for suspending said lower knife holder from said crosshead in spaced relationship, said crosshead and connecting means and lower knife holder forming a frame, an upper knife holder movably mounted on said frame intermediate said crosshead and lower knife holder, a pair of cooperating knives secured to said upper and lower holders, respectively, actuating means mounted on said assembly for causing relative movement of said knives from an initial position towards each other and back to said initial position, and a contact face on said frame disposed below said actuating means for engaging said pair of abutment means on the stationary structure with a portion of said assembly extending downwardly from said contact face into said guideway and being slidably received therein, said contact face being effective to limit downward movement of said frame in said guideway and support said assembly in a predetermined lower position while permitting upward movement thereof, said downwardly extending portion of the assembly clearing the confines of said guideway throughout so that said assembly is engageable with and freely removable from said guideway vertically as a unit, said assembly when in place on said abutment means being held vertically solely by the action of gravity.

3. A vertical shear as specified in claim 2, including a pair of the rods forming said connecting means, arcuate bearing faces of the guideway for engaging one segmental portion of each tie rod, arcuate mounting faces on the lower knife holder for contacting another segmental portion of each tie rod, a head at the lower end of said other segmental portion of each tie rod, projections on the head of said tie rods, and complementary projections on the lower knife holder in interlocking engagement with said first-mentioned projections to join said tie rods and said lower knife holder, the joint formed clearing the confines of said arcuate bearing faces of the guideway during movement of said frame.

4. A vertical shear for cutting metal as set forth in claim 2, including additional abutment means positioned on said upper knife holder outside of said guideway so as to clear the confines of the latter, stroke-limiting means on the stationary structure in the path of said additional abutment means for engagement therewith, and mechanism for selectively setting the spacing of the additional abutment means and stroke-limiting means in said initial position of the frame and upper knife holder, said mechanism providing for a maximum vertical spacing substantially equal to the distance from the edge of the upper knife in its initial position to the underside of said metal for permitting downward movement of said upper knife holder and knife through said distance to perform a down-cut operation, a minimum vertical spacing substantially equal to the distance from the edge of the upper knife in its initial position to the top of said metal for arresting said upper knife holder and knife upon engagement of said stroke-limiting means and then causing said frame with the lower knife thereon to rise from the first-mentioned abutment means to perform an up-cut operation, and an intermediate vertical spacing for first permitting downward movement of said upper knife holder and knife until arrested upon engagement of said stroke-limiting means to sever one portion of the thickness of the metal by a down-cut operation and then causing said frame with the lower knife thereon to rise from the first-mentioned abutment means to sever the remaining portion by an up-cut operation.

5. A vertical shear for cutting metal as set forth in claim 2, in which said actuating means includes a hydraulic cylinder and plunger aggregate secured to said crosshead and connected to said upper knife holder for causing relative movement of said knives towards each other, and a pair of auxiliary hydraulic cylinder and plunger aggregates mounted on said crosshead, and in which auxiliary crossheads and tie rods are provided for connecting said auxiliary cylinder and plunger aggregates to said upper knife holder for causing relative movement of said knives away from each other.

References Cited in the file of this patent

UNITED STATES PATENTS

| Re. 17,079 | Hahn | Sept. 11, 1928 |
| 642,631 | Rothe | Feb. 6, 1900 |
| 786,236 | Ross | Mar. 28, 1905 |
| 1,241,254 | Payne | Sept. 25, 1917 |
| 2,648,383 | Hahn | Aug. 11, 1953 |
| 2,722,174 | Albers | Nov. 1, 1955 |
| 2,757,731 | Musly | Aug. 7, 1956 |
| 2,825,405 | Maass | Mar. 4, 1958 |

FOREIGN PATENTS

| 687,337 | Germany | Jan. 27, 1940 |
| 1,034,456 | Germany | July 17, 1958 |
| 1,050,150 | Germany | Feb. 5, 1959 |